United States Patent [19]

Nagata et al.

[11] 4,365,115

[45] Dec. 21, 1982

[54] TIME-AXIS COMPRESSION-EXPANSION DEVICES FOR SOUND SIGNALS

[75] Inventors: Masayuki Nagata; Shozo Miyazawa, both of Suzaka, Japan

[73] Assignee: Kanbayashi Seisakujo Company, Ltd., Naganoken, Japan

[21] Appl. No.: 141,617

[22] Filed: Apr. 18, 1980

[30] Foreign Application Priority Data

| Apr. 28, 1979 | [JP] | Japan | 54/052738 |
| May 26, 1979 | [JP] | Japan | 54/065496 |
| Aug. 1, 1979 | [JP] | Japan | 54/106717[U] |

[51] Int. Cl.³ .............................................. G11B 13/00
[52] U.S. Cl. .................................... 179/15.55 T; 360/8
[58] Field of Search ................ 179/15.55 R, 15.55 T, 179/1 SH; 360/8; 369/2; 84/1.01, 1.24

[56] References Cited

U.S. PATENT DOCUMENTS

| 2,876,004 | 3/1959 | Sink | 360/73 |
| 3,621,150 | 11/1971 | Pappas | 179/1 SH |
| 3,721,451 | 3/1973 | Fakler et al. | 360/73 |
| 3,828,361 | 8/1974 | Schiffman | 360/73 |
| 3,949,174 | 4/1976 | Sutton | 179/1 SH |
| 3,949,175 | 4/1976 | Tanizoe et al. | 179/15.55 T |
| 3,997,913 | 12/1976 | Rittenbach | 360/8 |

*Primary Examiner*—Emanuel S. Kemeny
*Attorney, Agent, or Firm*—Birch, Stewart, Kolasch & Birch

[57] ABSTRACT

The device of the present invention utilizes a processing principle for time-axis compression-expansion devices which presents variations of reproduction speed from reducing the intelligibility of sounds. Sound signals, without being subjected to any time-axis processing, are altered in frequency while some reduction in intelligibility would be expected to occur, the sound signals are subjected to time-axis transformation processing (compression-expansion processing) to yield reproduced signals of high intelligibility.

The present invention is characterized by the capability of making this type of processing available through the use of simple, inexpensive system configurations such as an analog to digital conversion system based on delta/$\Delta$ modulation. The speed-changer signal processing circuitry is bypassed automatically when record-playback speeds are the same to avoid processing noise.

4 Claims, 10 Drawing Figures

TIME-AXIS COMPRESSION-EXPANSION DEVICES FOR SOUND SIGNALS

BACKGROUND OF THE INVENTION

The present invention relates to an improvement of time-axis compression-expansion devices for sound signals.

Tape recorders have been used for the preparation of conference minutes, of the grasp of conference proceedings through repetitive listening to the tape, for language training, etc. However, with them a number of disadvantages have been experienced, as follows, from the standpoint of efficient execution of jobs. In preparing conference minutes or in language training, the tape recorder needs to be stopped from time to time for the purpose of time adjustment, since the speed of speech coming from the tape recorder exceeds the writing speed of the listener. In addition, when one wants to run the recorder to confirm what has been recorded at a conference or lecture meeting, one needs to spend as much time listening to the tape required for recording. These jobs may be performed with improved efficiency, for example, by adjusting the motor driving system of tape recorder to slow down or speed up the reproduction speed. While such adjustment may change the speed of speech to the level appropriate for the purpose intended, it causes the pitches of speech sounds to be varied with a result of lowered intelligibility of sounds making it extremely difficult to grasp the content of speech. There has, therefore, been a demand for a device which may adjust the reproduction speed or recorded matter without an accompanying change in sound pitch. Such demand has previously been satisfied the use of rotatary magnetic head systems which handle sounds as analog signals, i.e., with no A/D conversion, with device which employs analog or digital memory elements to adjust sound pitches by altering the speed of address change for write and read, or with a device which employs a random access memory with write and read controls as exemplified by U.S. Pat. No. 3,786,195 to Schiffman. However, these conventional devices are handicapped by complex structures which make these products expensive.

Conventional devices designed to meet such demand are provided with two operating sections, one of which changes the compression-expansion ratio and the other turns on and off the time-axis compression-expansion function. For the changeover of the compression-expansion ratio two systems have been proposed, the continuous setting system and the stepwise setting system for the ratio. Treatment of sound signals with a time-axis compression-expansion device, however, will inevitably result in output of sounds with reduced quality, for example, since transfer among memory elements causes wave form to be distorted, AD or DA conversion causes noises to be made, and the discontinuity at signal connecting sections gives rise to noises. On the other hand, when sound signals are subject only to change of reproduction speed without time-axis compression-expansion processing applied, it has experimentally been proved that, although the frequency pitch is caused to change with resulting change in tone, the intelligibility of reproduced sounds remains unchanged as long as there is little difference between the reproduction and original recording speeds.

In addition, conventional devices are operated, for changing the speed of reproduced sounds, by handling by hand a knob provided on their adjustment operating sections, which manual operation is tedious and thereby lowers job efficiency in making typed or written documents from recorded tapes, etc.

SUMMARY OF THE INVENTION

It is an object of the present invention to make available a defectless, simple, inexpensive time-axis compression-expansion devices for sound signals, thereby contributing to the ease of repetitive listening for grasping conference minutes, language training, etc. and also to make available a handling device most suitable for the speed-change operation on reproduced sounds.

This and other objects of the present invention will become more fully apparent with reference to the following specification and drawings which relate to the preferred embodiments of the present invention.

DETAILED DESCRIPTION OF THE INVENTION

Figure 1:
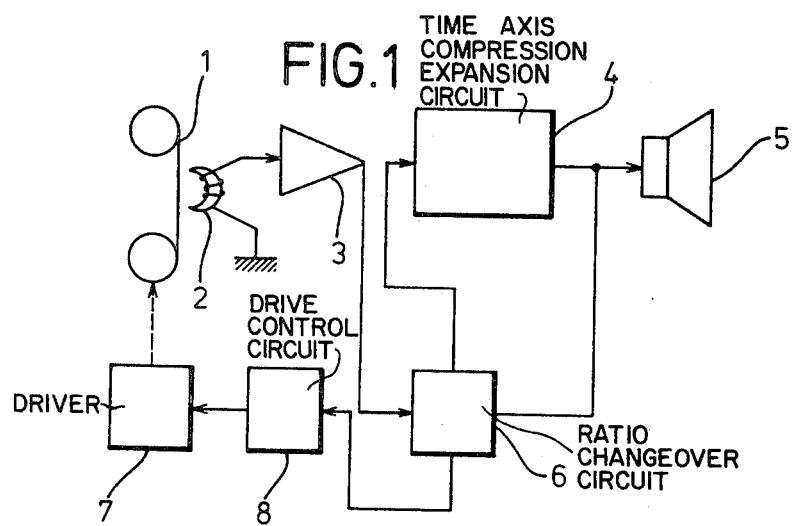
FIG. 1 is a block diagram of the first embodiment of the present invention.
Figure 3:
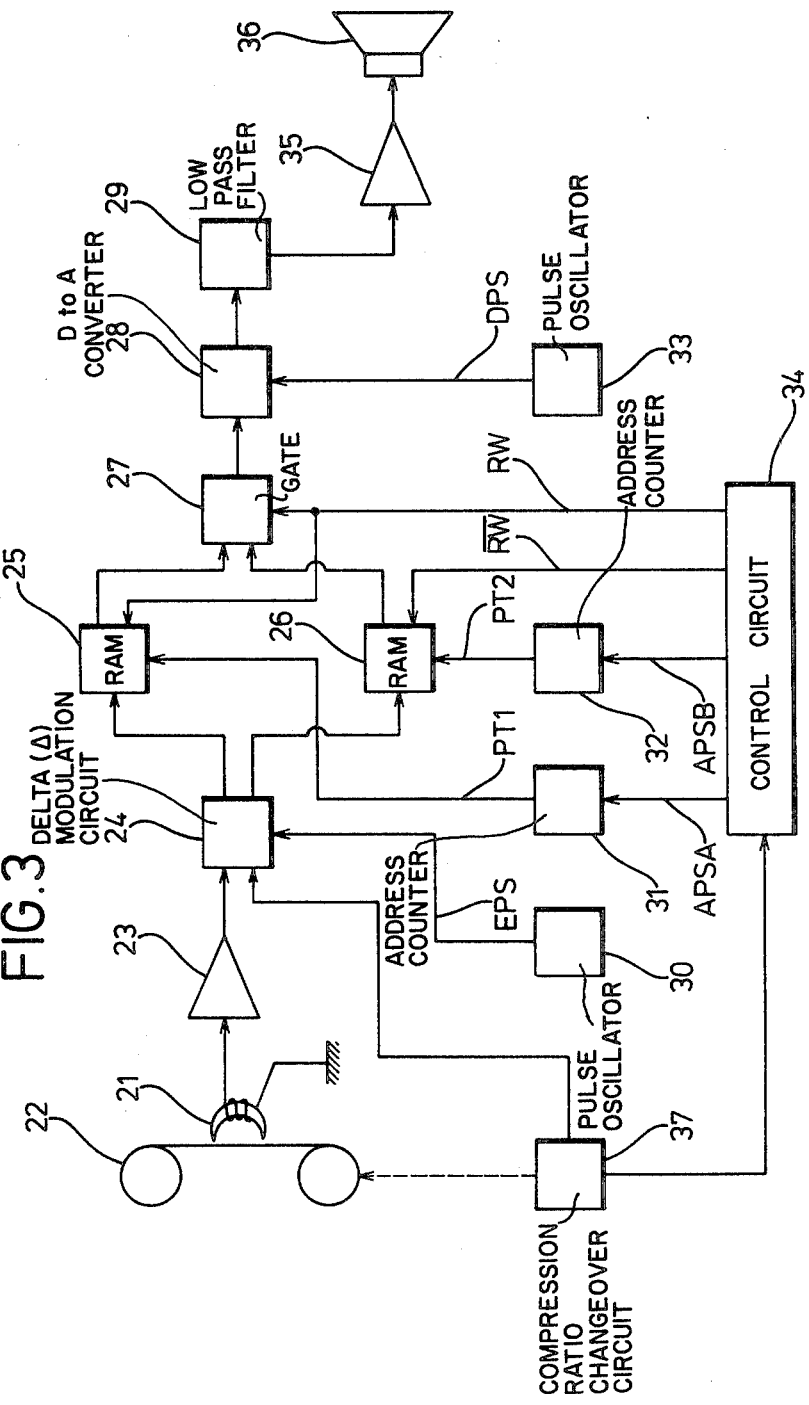
FIG. 3 is a block diagram of a second embodiment of the present invention.

For the purpose of eliminating the above-mentioned disadvantages, the present invention envisions an operational, processing means as shown in the FIG. 1 embodiment which changes over the time-axis compression-expansion ratio, and also a compression-expansion device as shown in the FIG. 3 embodiment which is based on the delta (Δ) modulation system. Another compression-expansion device according to the present invention is disclosed in the FIG. 7 embodiment of the present invention which is equipped with a random access memory in its digital signal memory and is capable of writing digitalized sound signals in the memory at prescribed periods and reading out them at different periods, and a foot-operated sound-reproduction speed changer is disclosed in the FIG. 9 embodiment of the present invention which is to be attached to a time-axis compression-expansion device capable of not only of varying the speed of reproduction of sound signals of the recording device but is also capable of applying a conversion processing to frequency pitches of reproduced signals so as to produce easily audible sounds.

The discussion of the present invention presented below should be detailed by referring to the drawings appended.

In FIG. 1, the first embodiment of the present invention, 1 is a magnetic tape with sounds recorded thereon, 2 is a reproducing head for reproducing the sound recorded, 3 is a pre-amplifier for amplifying the reproduced signal previously arranged by the reproducing head 2 to such a level as is adequate for the treatment of time-axis compression and expansion, 4 is a time-axis comression-expansion circuit which compresses or expands the sound signal input via the pre-amplifier 3, 5 is a speaker, 6 is a compression-expansion ratio changeover circuit which changes over the time-axis comression-expansion ratio, 7 is a driving device for the magnetic tape 1, and 8 is a drive control circuit which controls the driving device 7.

Figure 2:
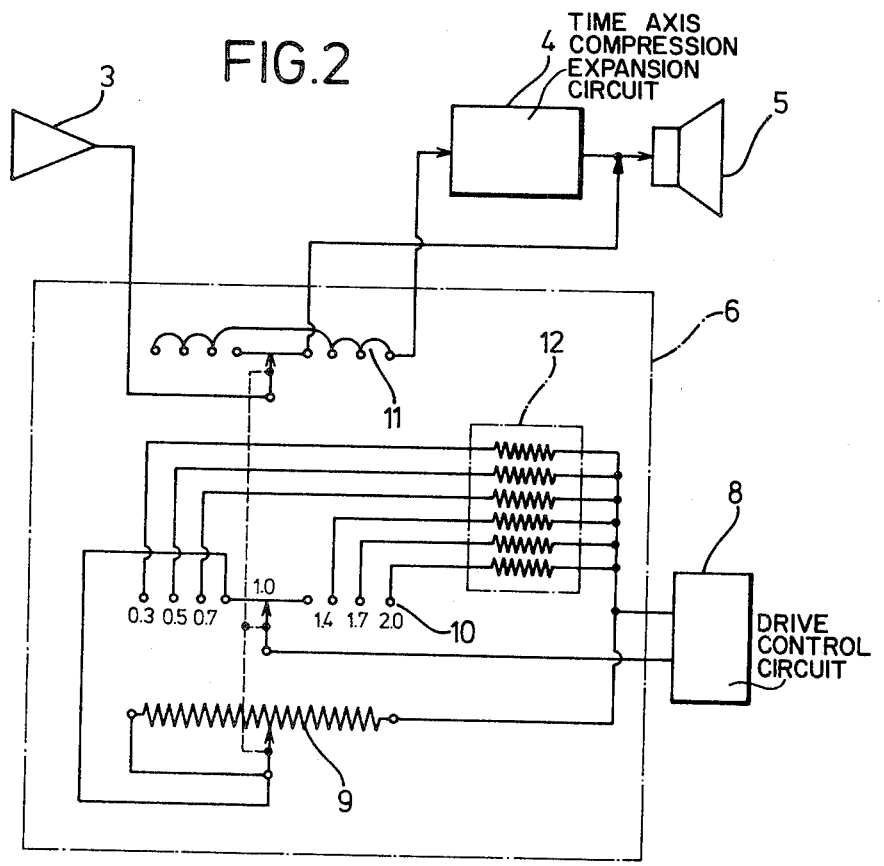
FIG. 2 is a circuit diagram for the compression expansion ratio changeover circuit of FIG. 1.

The compression-expansion ratio changeover circuit 6 shown in FIG. 2 in correspondence with FIG. 1, is composed of the slide resistor 9, the slide switches 10 and 11, and the group of resistors 12 connected between the slide switch 10 and slide resistor 9; the slide resistor 9 operates in connection with the slide switches 10 and 11.

When the compression-expansion ratio is equal or close to unity, the structure shown in FIGS. 1 and 2 allows the slide switch 10 to connect the slide resistor 9 to the drive control circuit so that the magnetic tape 1 may be subject to continuous speed control and permits the slide switch 11 to make the sound signal from the pre-amplifier 3 bypass the time-axis compression-expansion circuit 4 directly to the speaker 5. When the compression-expansion ratio is other than the above (for example ratios 0.3, 0.5, 0.7, 1.4, 1.7, and 2.0 as adopted in FIG. 2), the slide switch 10 is allowed to select out of the group of resistors 12, the resistor which corresponds to the compression-expansion ratio set and connect it to the drive control circuit 8, thereby establishing the required speed of magnetic tape; simultaneously, the slide switch 11 is permitted to lead the sound signal from the pre-amplifier 3 to the time-axis compression-expansion circuit 4 so that the sound signal after time-axis processing may be transmitted to the speaker 5.

In connection with the above example, modifications according to actual need are of course available, for example, such a device is capable of changing the reproducing speed while not modifying the tone compensate for the variation of the original speed. The processing of time-axis compression-expansion is to be applied to sound signals before reproduction only when the above device fails to produce adequately audible sounds.

As seen from the above explanation, the present invention may provide high-performance time-axis compression-expansion since the device designed to choose the execution of the time-axis compression-expansion processing depending on values for the compression-expansion ratio.

Referring now to the second example of the present invention as shown in FIG. 3, 22 is a magnetic tape with recorded sounds, 21 is a reproducing head for reproducing the sound recorded on the magnetic tape 22, 23 is a pre-amplifier for amplifying the reproduced signal previously arranged by the reproducing head 21 to a suitable level for the time-axis processing, 24 is a delta ($\Delta$) modulation system which subjects the output from the pre-amplifier 23 to constant-difference modulation ($\Delta$ modulation), and 25 and 26 are random access memories (RAM hereinafter). According to the respective pulse timing signals PT1 and PT2 from the address counters 31 and 32 and the read-write signals RW and $\overline{RW}$ from the control circuit 34, the RAMS serve to store digital data from the delta ($\Delta$) modulator 24 or read out this stored data to the DA converter 28 via the gate circuit 27. Low pass filter 29 filters out the high-frequency components of the analog data from the DA converter 28 before outputting this data to the output amplifier 35. Speaker 36 is connected to the output amplifier 35, pulse oscillators 30 and 33 output respectively encoded pulse EPS and decoded pulse DPS signals for putting the delta ($\Delta$) modulator 24 and the DA converter 28 into operation, respectively, and compression-expansion ratio changeover circuit 32 which changes over the compression-expansion ratio for the reproduced sounds. This structure is characterized by the following functions. A change of setting of the compression-expansion ratio changeover circuit 37 will result in not only a change in repetition rate of address pulses APSA and APSB via the control circuit 34 but also changes both the modulation ratio of the delta ($\Delta$) modulator 24 and the tape speed of tape recorder. The outputs EPS and DPS from the pulse oscillators 30 and 33 to the control circuit will produce the read-write signals RW and $\overline{RW}$ of fixed and variable frequencies.

The above-described structure employs RAM as memory, but it is of course possible for the RAM to be substituted with shift registers.

Figure 4:
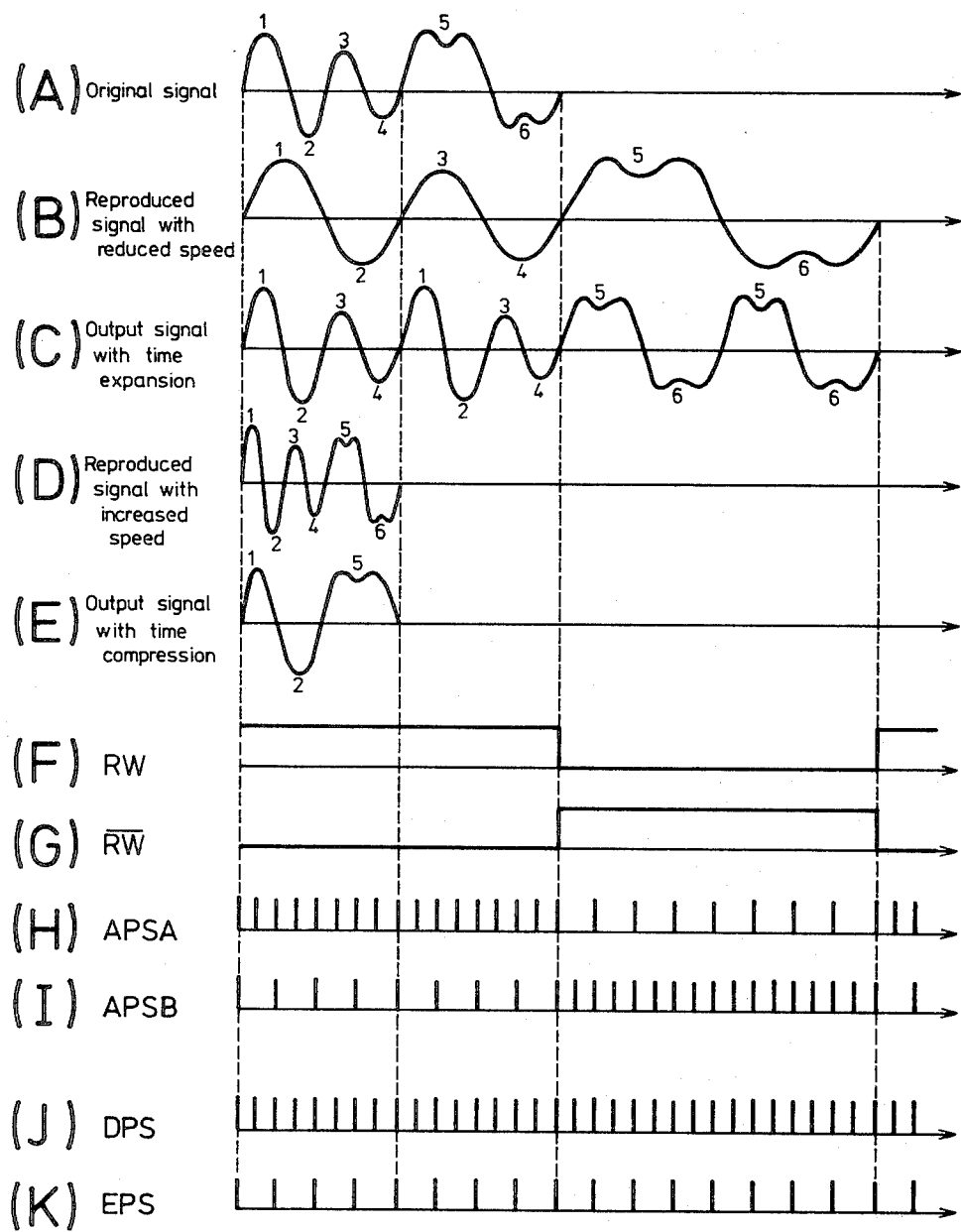
FIGS. 4(A)-(K) are timing charts for demonstrating the operation of FIGS. 1-3.

Below will the timing chart of FIG. 4 be referred to for explaining the operation of the time-axis compression-expansion device having the above-described structure.

FIG. 4(A) shows an original signal obtained from the recorded sounds at an ordinary tape speed. FIG. 4(B) shows a reduced-speed reproduced signal obtained by a reproduction with, for example, half the ordinary tape speed. The signals frequency is reduced to half the frequency of the original signal's. This reduced-speed reproduced signal is electromagnetically read by the reproducing head 21 from the magnetic tape 22, transmitted to the delta ($\Delta$) modulator 24 via the pre-amplifier 23, and then subjected to an AD conversion according to the timing of the encoded pulse EPS, shown in FIG. 4(K). The signal is then output from the pulse oscillator 30 and written into addresses within RAMs 25 and 26 in accordance with address counters 31 and 32, respectively. These two RAMs 25 and 26 repeat alternate write and read modes under the direction of the read-write signal RW, shown in FIG. 4(F), issued from the control circuit 34 and the read-write signal $\overline{RW}$, shown in FIG. 4(G), with reverse phase relative to the signal RW. Simultaneous with this alternate mode repetition, the address pulse APSA and APSB, shown in FIGS. 4(H) and (I), are issued from the control circuit 14 and are counted by the address counters 31 and 32, respectively, resulting in the control of write and read speeds of the RAMs 25 and 26. In this example with a value of ½ as the sound compression-expansion ratio, the speed with which the data is read from RAMs 25 and 26 is twice as high as that for data written into the RAMs 25 and 26. Thus, that data read from RAMs 25 and 26 is alternately transmitted by the gate circuit 27 to the DA converter 28, where it is converted an analog signal in accordance with the timing of the decoded pulse DPS, shown in FIG. 4(J). This signal is then output from the pulse oscillator 33. Accordingly, the reduced-speed reproduced signal, shown in FIG. 4(B), having a frequency equal to half the original signal's has the same frequency components as the original signal after passage through the DA converter 28 as shown in FIG. 4(C). Finally, the time-expanded output signal will be output as sound from the speaker 36 via the low pass filter 29 followed by the output amplifier 35.

In FIG. 4(C) each block of the original signal is repeated twice. This is because blanks produced from frequency adjustment have been filled by repeated readout of data from RAM in order to produce for pauseless, smooth output signals. On the other hand, FIG. 4(D) illustrates the reproduction of original signals at double the tape speed, the frequency being twice as high as the original signal's. In this case, contrary to the case of the above-described time-expansion, the time-compression applied causes the repetition rate of encoded pulse signal EPS to be double the repetition rate of decoded pulse signal EPS to be double the repetition rate of decoded pulse signal DPS, thus making the frequency of the sound output signal unchanged with respect to the original signal as shown in FIG. 4(E). The wave form of FIG. 4(E) is devoid of part of the wave form of original signal. This is because the frequency adjustment has the increased RAM data and excessive data have been deleted.

Figure 5:
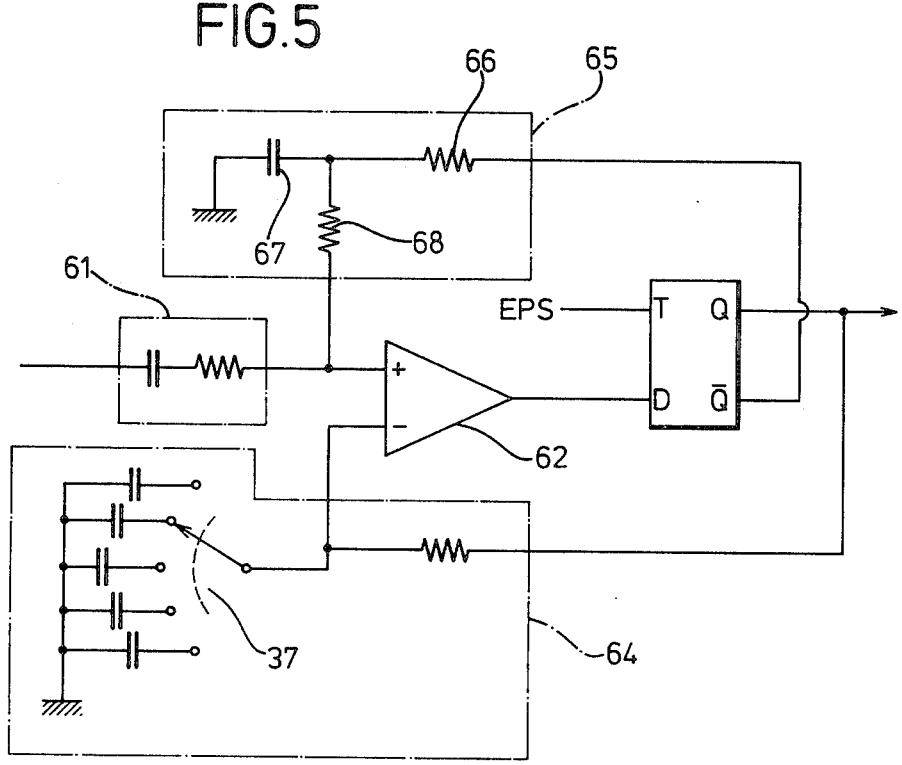
FIGS. 5 and 6 are circuit diagrams showing details of A to D converter 24 and D to A converter 28 of FIG. 3.

FIG. 5 shows the detail of the circuit of the AD converter used in the delta ($\Delta$) modulator. The circuit is composed of the signal input section 61, comparator 62, flip flop 63, local decoder 64, and automatic level adjusting circuit 65.

Other systems making use of PCM (Pulse Code Modulation), etc. are available for AD conversion, though these systems are complex and expensive. The delta ($\Delta$) modulator of the present invention produced in the circuit configuration disclosed herein is simple and inexpensive to manufacture.

The sound input signal is passed through the signal input section 61 composed of a capacitor and a resistor and led to the positive input terminal of the comparator 62. The negative input terminal of the comparator 62 receives an analog-decoded Q output from the flip-flop 63 which holds the sample until the presence of an encoded pulse EPS is sensed. Therefore, the sound input signal is compared with the input value previously sampled in conjunction with the timing of encoded pulse EPS and is converted into a digital signal "0" or "1" depending on its magnitude. The automatic level adjusting circuit 65 integrates the $\overline{Q}$ output from the flip flop 63. The time constant of the automatic level adjusting circuit 65 is dependent on the resistor 66 and capacitor 67. The automatic level adjusting circuit feeds the result back to the sound input line via the resistor 68, thereby automatically adjusting the levels of the two inputs for the comparator 62.

Figure 6:
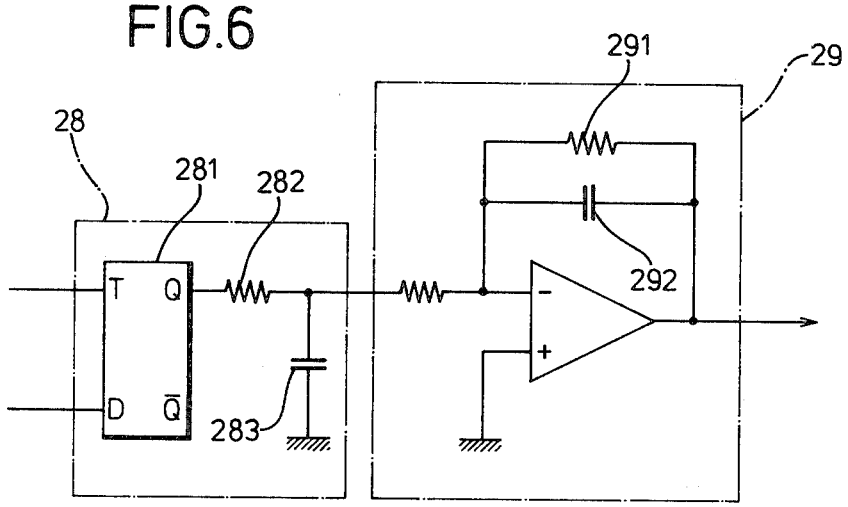

The outputs from RAMs 25 and 26 are fed as a series of continuous signals to the input terminal of the DA converter 28 via the gate circuit 27. This DA converter 28, consisting of a flip flop 281 for sample hold, a resistor 282 for integration, and a capacitor 283 as shown in FIG. 6, which serves to convert digital to analog signals. The time-axis compression-expansion processed signal, after DA conversion, finally enters the low pass filter 29, where frequencies higher than the cut-off frequency determined by the resistor 291 and capacitor 292 are not allowed to pass. Thus the sound output signals will be reproduced with a reduced degree of noises.

Figure 7:
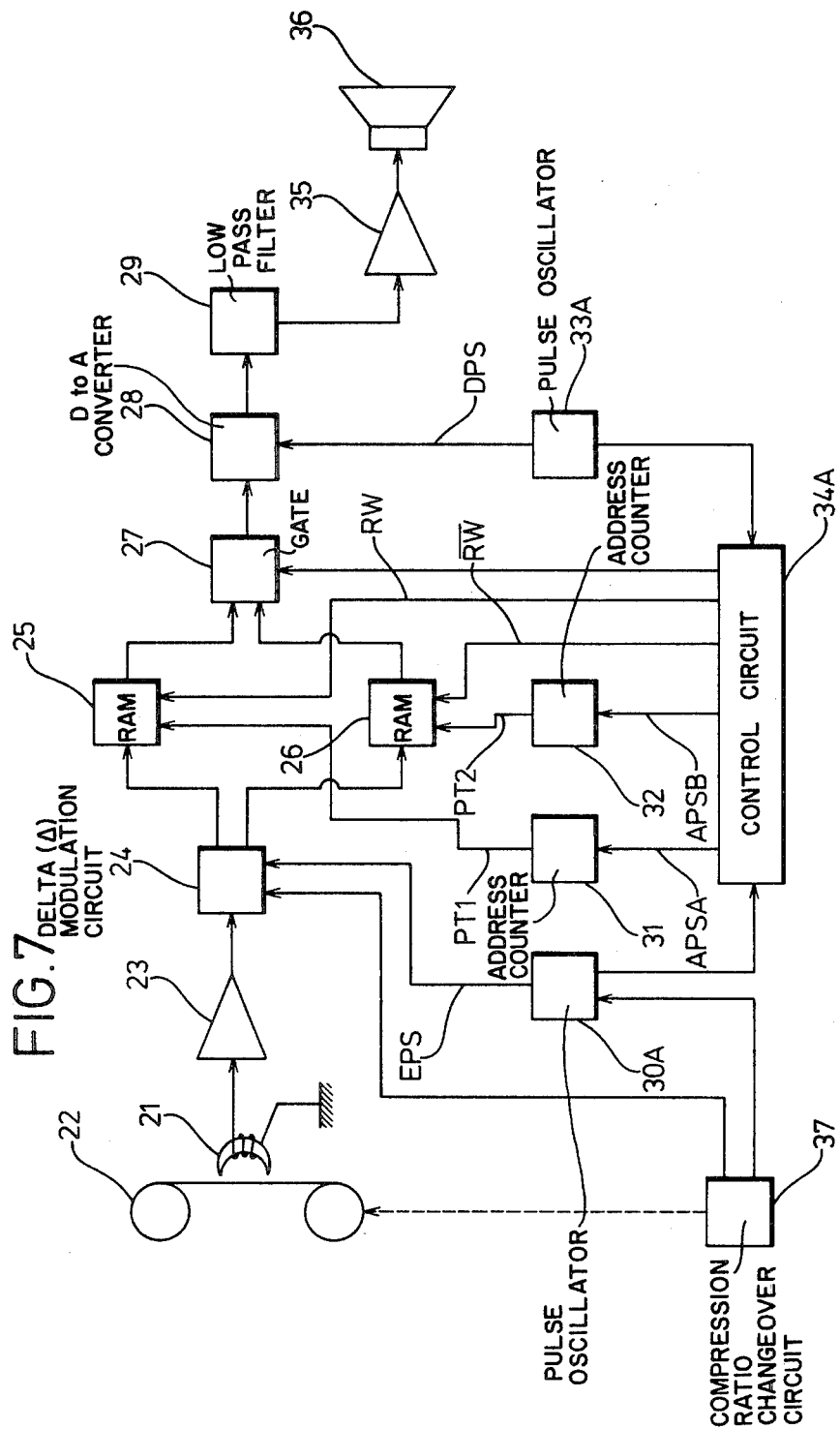
FIG. 7 is a block diagram of a third embodiment of the present invention.
Figure 8:
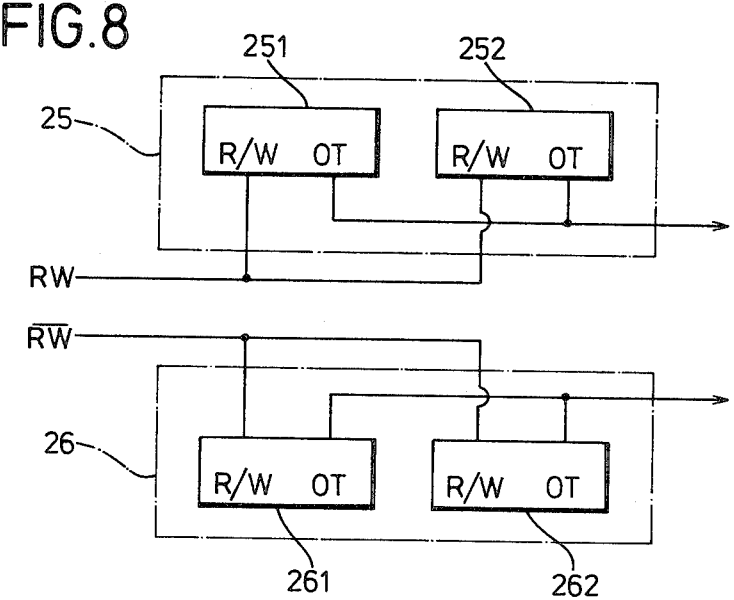
FIG. 8 is a block diagram indicating an example structure of the memory of FIG. 7.

Referring now to FIG. 7, for the third example of the present invention, in correspondence with FIG. 3, 30A and 33A are pulse oscillators corresponding to pulse oscillator 30 and 33 of the FIG. 3 embodiment, respectively, and 34A is a control circuit corresponding to control circuit 34 of FIG. 3. This device may operate as shown in FIGS. 4(A)-(K). In this case, RAMs 25 and 26 are composed respectively of two RAM chips 251 and 252, and 261 and 262. The RAMs are first divided into write or read mode according to the level of the signal added to the R/W terminals. The two series of RAMs work complementally with each other repeating alternately write and read, since RAM 25 receives the read-write signal RW by dividing the encoded pulse signal EPS generated by the pulse oscillator 30A and RAM 26 receives read-write signal $\overline{RW}$ corresponding to the read-write RW with inverted phase. That is, while RAM 25 is in write mode, RAM 26 is in read mode and while RAM 25 is in read mode, RAM 26 is in write mode, resulting in the simultaneous occurrence of continuous writing and reading of a series of signals. The processing of time-axis compression-expansion due to the present invention is based on variation of write and read speeds and it is the oscillators 30A and 33A, the control circuit 34A, and the address counters 31 and 32 that take charge of the control of this variation in speed. This control is effected in the following sequence. The control circuit 34A generates address pulses in which encoded pulse signal EPS generated the pulse oscillator 30A varies the pulse repetition rate in accordance with the setting of the compression-expansion ratio changeover circuit 37. Decoded pulse signal DPS, with fixed pulse repetition, generated from the pulse oscillator 33A appear alternately in synchronism with the timing of read-write signal RW. These address pulses are transmitted to the address counters as address pulses APSA and APSB, respectively. The address counters 31 and 32 designates addresses for RAMs 25 and 26, respectively, and according to the current mode state, data is writtenf into, or read out of the designated address. In addition, with this circuit, the formation of address designation pulse at data write-in is in synchronism with the encoded pulse signal EPS and, the repetition of address designation pulse at data read-out is in synchronism with the decoded pulse signal DPS. Thus, the signal compression or expansion is effected according to the ratio of these two pulse repetitions.

On the other hand, the outputs from RAMs 25 and 26 are fed as a series of continuous signals into the input terminal for the DA converter 28 via the gate circuit 27. This DA converter 28, consisting of a flip flop 281 for sample hold, a resistor 282 for integration, and a capacitor 283 as shown in FIG. 6, serves to convert digital to analog signals. The time-axis compression-expansion processed signal, after DA conversion, finally enters the low pass filter 29, where frequencies higher than the cut-off frequency determined by the resistor 291 and capacitor 292 are filtered out; thus the sound output is reproduced with a degree of noise.

As described above, this time-axis compression-expansion device employs the random access memory, a digital memory element, as the major component. This RAM is controlled by the basic system. Therefore, this device of the present invention may have an extremely simple circuit construed around the memory thus rendering the circuit of the present invention inexpensive and of high reliability.

In the novel mechanism of the present invention the use of two oscillators allows free change in the frequency of the write pulse, making it possible to arbitrarily set the compression-expansion ratios. Thus, the circuit employed is very simple as compared with the conventional division system in which write and read pulses are formed by division of basic clock pulses.

Figure 9:
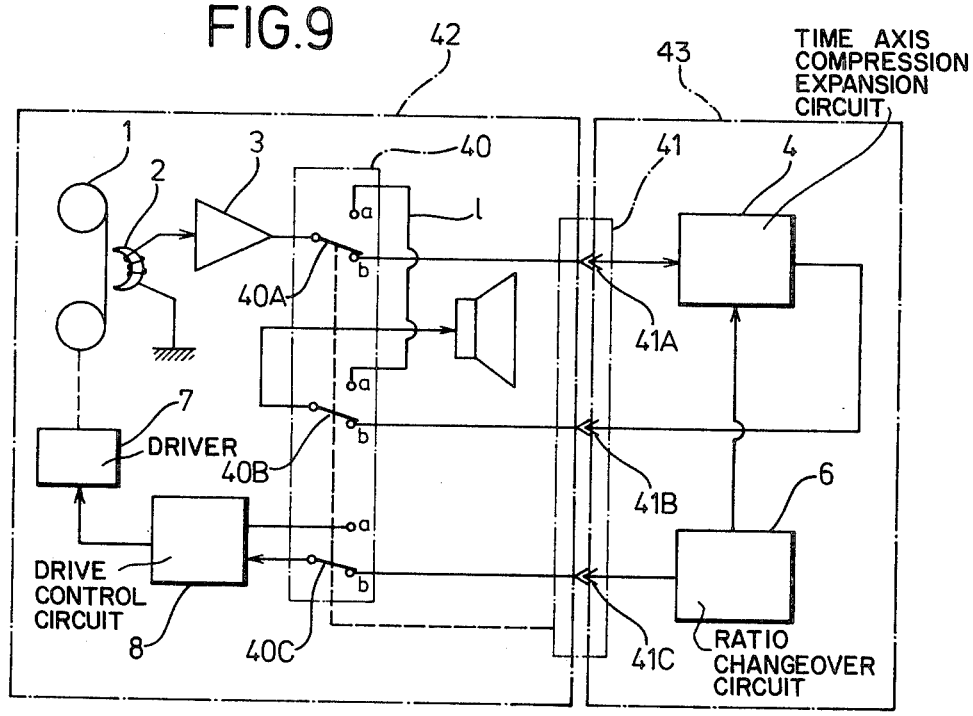
FIG. 9 is a block diagram of a fourth embodiment of the present invention.

The device shown in FIG. 9 in correspondence with FIG. 1 is designed to have a sound reproducing unit and time-axis compression-expansion unit separable for each use. The output of the pre-amplifier 3 is input to the time-axis compression-expansion circuit 4 via the contact 40A of the changeover switch 40 and the contact 41A of the connector unit 41. The output of this time-axis compression-expansion circuit 4 is input to the speaker 5 via the contact 41B of the connector unit 41 and by the contact 40B of the changeover switch 40. The compression-expansion ratio changeover circuit 6 issues driving signals to the drive control circuit 8 via the contact 41C of the connector unit 40 and the contact 40C of the changeover switch 40. The contacts 40A–40C of the changeover switch 40 are switched in accordance to the state of connection of the connector unit 41. When the sound reproducing unit 42 and the time-axis compression-expansion unit 43 are brought into close contact with each other, connection is made between terminal b sides as shown in the figure, whereas when both are separated, connection is made between terminal a sides. The terminal a of the contact 40A is connected with the terminal a of the contact 40B through the line 1.

With such a structure, while a time-axis compression-expansion processing is under way, the connector unit 41 connects the sound reproducing unit 42 and the time-axis compression-expansion unit 43 as shown, and the contacts 40A–40C of the changeover switch 40 are connected to the terminal b side. Therefore, the sound signal which the reproducing head 2 has reproduced from the magnetic tape 1, after amplification by the pre-amplifier 3 is applied to the time-axis compression-expansion circuit 4 via the contacts 40A and 41A and this sound signal is subject to a time-axis processing in accordance with the setting of the compression-expansion ratio changeover circuit 6. The sound signal, having been subjected to the time-axis processing, is output from the speaker 5 via the contacts 41B and 40B. The compression-expansion ratio changeover circuit 6 arranges tape speed in accordance with its setting by passing the driving signal to the drive control circuit 8 via the contacts 41C and 40C to control the drive circuit 7.

When the connector unit 41 separates the sound reproducing unit 42 from the time-axis compression-expansion unit 43, the connection of the contacts 40A–40C of the changeover switch 40 are switched in synchronism with the change of the connector unit 41 from the terminal b to the a side. Thus, the output of the pre-amplifier 3 is input from the terminal of contact 40A to the terminal a of the contact 40B via the line 1 and then output from the speaker. The contact 40C is also changed over to the terminal a side to internally short-circuit the drive control circuit 8, so that output of the control circuit 8 is input to the drive circuit 7, causing the magnetic tape 1 to move at a tape speed specified for an ordinary sound record-reproduce device. Thus, in the case of separation of both the units by means of the connector unit 41, ordinary record-reproduce operations are carried out by the sound reproducing unit 42 only, and no time-axis compression-expansion processing is applied to the reproduced sounds.

As described aove, this device is capable of either connection or separation of the sound reproducing unit and the time-axis compression-expansion unit by means of the connector unit. Therefore, we may apply time-axis compression-expansion processing, if needed, by uniting both the units; or we may employ only ordinary recording-reproducing by separating both the units if no time-axis processing is needed. It may thus be emphasized that the present invention is a time-axis compression-expansion device having high degree of freedom in manageability and weight.

In the example of FIG. 9, both the sound reproducing unit and the time-axis compression-expansion unit are united by the connector unit. However, it is possible to have both the units apart from each other by using connectors, cables, etc. on the connector unit.

Figure 10:
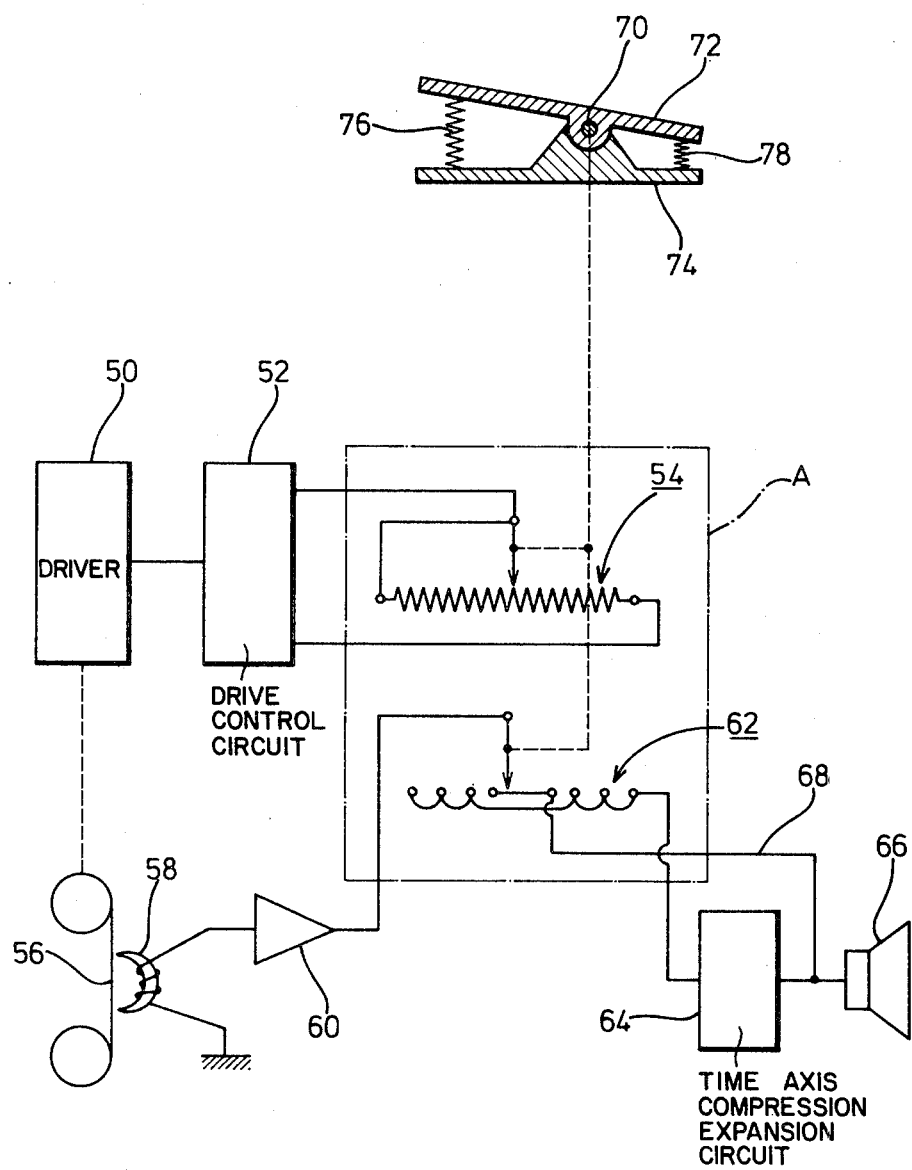
FIG. 10 is a configurational diagram suggesting other applications of the present invention.

FIG. 10 shows a reproduced-sound speed changer of the present invention, where 50 is the tape driving section which is connected to the slide resistor 54 via the driving-section control circuit 52.

56 is a magnetic tape and its recorded sounds are converted into reproduced signals by means of the reproducing head 58. The reproducing head 58 is connected to the pre-amplifier 60 which amplifies the reproduced signal to such a level as is needed for application of the time-axis compression-expansion processing. This signal is then connected to the compression-expansion ratio changeover section 62 which changes over the compression-expansion ratio. The compression-expansion ratio changeover section 62 is connected to the speaker 66 via the time-axis compression-expansion circuit 64 which subjects signals reproduced at a speed different from the original signal's speed to compression-expansion precessing by partial deletion or multiplication.

In the example shown, the compression-expansion ratio changeover section 62 has a stepwise setting of ratios and when the speed ratio of reproduced to the original sound is equal or close to unity, the signal from the pre-amplifier 60 is reproduced directly, without being subjected to A/D conversion. This signal is applied to the speaker via the bypass circuit 68. This is because it is desirable to select this bypass circuit 68 in order to remove the possibility of sound quality deterioration caused by time-axis compression-expansion processing when its use is unnecessary.

The slide resistor 54 and the compression-expansion ratio changeover section 62, after having been set in a definite positional relation, will allow the driving-section control circuit 52 to control the tape drive section 50 so that the magnetic tape 56 may be driven at the same speed as, or at a different speed from that of original sound.

Modified sound signals reproduced by the reproducing head 58, after being amplified by the pre-amplifier 60, are passed through the compression-expansion ratio changeover section 62 previously set to connect the signal the time-axis compression-expansion circuit 64, where the sound undergoes a tone restoring processing to render the output from the speaker as a highly audible sound.

Note that the variation operating section A, containing at least the slide resistor 54 and the compression-expansion ratio changeover section 62, is separated from the unit containing at least the recording-reproducing mechanism so that it may be handled by remote control.

The slide resistor 54 and the compression-expansion ratio changeover section 62 are designed to be subject to adjustment by means of the rotary shaft 70 with the above-mentioned positional relation maintained. This adjustment may be made either continuously or stepwise by selecting methods for processing the time-axis compression-expansion for sounds.

The foot-plate 72 is attached to the rotary shaft 70 so that the ratio in length of the front section to the length of the rear section is about 2:1. The foot-plate 72 is capable of moving the rotary shaft 70 back and forth on the cradle 74 against the elastic power of the springs 76 and 78.

The springs 76 and 78 are provided at the front and rear ends of the footplate 72, respectively, between the foot-plate 72 and the cradle 74. When the foot-plate 72 is tilted, the elevated section is caused to be detached from the upper end of the spring, enabling the footing operation to be done with the application of a slight force.

In the example shown, the variation operating section A is designed in such a way that the foot-plate 74 when tilted by applying the foot forward or backward will speed up or slow down the reproduction stepwise, respectively; releasing the foot application to return the foot-plate to the auto-positioning state will result in reproduction at the ordinary speed.

It is of course possible to set the foot-plate in such a way that backward application of the foot will speed up the reproduction.

The foot-plate 72 may be attached to the rotary shaft 70 at any positions.

As seen from the above description, this reproduced-sound speed changer of the present invention enables the simple foot application to freely change the speed of reproduced sound, making both the hands of operator free as to promote the efficiency of jobs such as typing.

What is claimed is:

1. A time-axis compression-expansion device for use in reproducing an originally recorded signal stored in a recording medium, said device comprising:
    variable rate transducer means for reproducing said originally recorded sound signals at a frequency pitch and speed different from the pitch and speed used in recording and for producing a reproduced sound signal, said different frequency pitch adversely effecting the intelligibility of said reproduced sound signal;
    time-axis compression-expansion processor means for changing the tone of said reproduced sound signal to correspond said tone to the tone of said originally recorded sound signal, thereby forming a converted sound signal including,
    delta modulation means for converting said reproduced sound signal into a digital input signal; and
    means for modifying said digital input signal to thereby form a converted digital signal; and
    digital-to-analog converter means for changing said converted digital signal into an analog converted sound signal; and
    means for converting said converted sound signal into an audible output having a frequency content similar to said originally recorded signal but having a speed different from the speed of said originally recorded signal;
    said time-axis compression expansion processor means modifying said digital input signal so as to change the tone of said reproduced signal to correspond to the tone of said originally reproduced signal;
    means for presenting said reproduced sound signal from said variable rate transducer means directly to said means for converting by bypassing said time-axis compression-expansion processor means when said speed of reproduction is substantially the same as said speed used in recording.

2. The device of claim 1, wherein said variable rate transducer means includes:
    a sound reproducing unit including a transducer for reading said signal stored on said recording medium; and
    wherein said variable rate transducer means and said means for converting are located in a first housing;
    said time-axis compression-expansion processor means, delta modulation means and digital-to-analog converter means being located in a second housing which is selectively connected to said first housing;
    said variable time transducer means and said means for converting forming in combination a transducer for reproducing the audio waves corresponding to said originally recorded signal when said first and second housings are not connected;
    time-axis compression-expansion processing being performed when said first and second housings are connected.

3. The device of claims 2 or 1, further comprising:
    a foot-plate pedal having a spring biased normal position corresponding to the original recording speed of said original recorded signal, the movement of said foot plate in a first direction speeding up the speed of said variable rate transducer means while the movement of said foot-plate in a second direction slows down the speed of said variable rate transducer means; and
    means for varying the speed of said variable rate transducer means in response to the position of said pedal to vary the speed of said reproduced signal.

4. The device of claim 1, wherein said time-axis compression-expansion processor comprises:
    a random access memory;
    means for converting said digital input signal into digital data and writing said digital data into said random access memory;
    means for reading said digital data out of said memory at a different rate than said data was written into said memory to form said converted digital signal.

* * * * *